United States Patent
Zhan et al.

(10) Patent No.: US 12,529,130 B2
(45) Date of Patent: Jan. 20, 2026

(54) COMPOSITE FORMING METHOD AND DEVICE COMBINING ELECTRIC PULSE CREEP AGING WITH LASER PEENING

(71) Applicant: Central South University, Changsha (CN)

(72) Inventors: Lihua Zhan, Changsha (CN); Haobo Ren, Changsha (CN); Yongqian Xu, Changsha (CN); Tinghao Li, Changsha (CN)

(73) Assignee: Central South University, Changsha (CN)

( * ) Notice: Subject to any disclaimer, the term of this patent is extended or adjusted under 35 U.S.C. 154(b) by 0 days.

(21) Appl. No.: 18/964,451

(22) Filed: Dec. 1, 2024

(65) Prior Publication Data
US 2025/0376748 A1  Dec. 11, 2025

(30) Foreign Application Priority Data
Jun. 11, 2024 (CN) .......................... 202410746835.5

(51) Int. Cl.
*B23K 26/356* (2014.01)
*C21D 10/00* (2006.01)
(Continued)

(52) U.S. Cl.
CPC .............. *C22F 1/04* (2013.01); *B23K 26/356* (2015.10); *C21D 10/005* (2013.01); *C22F 3/00* (2013.01); *B23K 2103/10* (2018.08)

(58) Field of Classification Search
CPC ...... C21D 7/06; C21D 10/005; B23K 26/356; B21D 31/06; C22F 1/04
See application file for complete search history.

(56) References Cited

U.S. PATENT DOCUMENTS

2016/0114370 A1 * 4/2016 Kozaki .................. B21D 11/14
72/310

FOREIGN PATENT DOCUMENTS

| CN | 106694724 A | 5/2017 | |
| CN | 107354409 A * | 11/2017 | ................ C22F 1/04 |

(Continued)

OTHER PUBLICATIONS

Xu, Y. Q., et al. "A low-density pulse-current-assisted age forming process for high-strength aluminum alloy components." The International Journal of Advanced Manufacturing Technology 97 (2018): 3371-3384 (Year: 2018).*

*Primary Examiner* — Sally A Merkling
*Assistant Examiner* — Sean P. O'Keefe
(74) *Attorney, Agent, or Firm* — Nitin Kaushik

(57) ABSTRACT

A composite forming method and device combining electric pulse creep aging with laser peening are provided. The method includes modeling a ribbed integral panel, simulating a creep forming process of the panel, and determining and marking localized difficult-to-deform areas. The panel is then pre-bent into shape, and the localized difficult-to-deform areas are performed a laser shock strengthening treatment. Electric pulse heating treatment is performed on the panel and creep aging forming is started. Whether an accuracy of the component surface meets a target accuracy is determined by comparing the scanned component surface with a target surface. For areas that do not meet the target accuracy, a secondary laser shock strengthening treatment is applied. The accuracy of the component surface is repeatedly determined until it meets the target accuracy. The present application improves a forming efficiency of complex curvature components.

6 Claims, 2 Drawing Sheets

(51) Int. Cl.
*C22F 1/04* (2006.01)
*C22F 3/00* (2006.01)
*B23K 103/10* (2006.01)

(56) References Cited

FOREIGN PATENT DOCUMENTS

| | | | | |
|---|---|---|---|---|
| CN | 109570321 A | | 4/2019 | |
| CN | 114952010 A | * | 8/2022 | ............. B21D 26/06 |
| CN | 116372010 A | | 7/2023 | |

* cited by examiner

COMPOSITE FORMING METHOD AND DEVICE COMBINING ELECTRIC PULSE CREEP AGING WITH LASER PEENING

CROSS-REFERENCE TO RELATED APPLICATIONS

The application claims priority to Chinese patent application No. 2024107468355, filed on Jun. 11, 2024, the entire contents of which are incorporated herein by reference.

TECHNICAL FIELD

The present application relates to the field of creep age forming technology, particularly to a composite forming method and device combining electric pulse creep aging with laser peening for ribbed panels in aerospace applications.

BACKGROUND

High-strength aluminum alloy large integral panels are an important component in developments of modern aerospace. The creep age forming process, which combines heat treatment with forming manufacturing, has become one of the important technologies for integral component manufacturing. Compared with traditional plastic forming techniques, creep age forming technologies have less damage during the forming process, lower residual stress inside the formed component, and better overall performance. However, the creep forming and strengthening precipitation of components are in a very complex thermal/mechanical environment, resulting in significant differences in the internal forming and forming conditions of large and complex components. Under an action of electric pulses, creep aging can increase a deformation of the creep, reduce an activation energy of aging precipitation in alloys, increase a nucleation rate of the alloys, and accelerate an aging precipitation process of the alloys. Meanwhile, a laser peening can generate residual compressive stress on surfaces of materials, promote stress relaxation of the materials, optimize a formability of locally complex structures, and improve a forming accuracy of integral components. A use of multi-process composites can ensure high-quality and precise forming of large and complex integral panel components. Currently, there are several technologies that have been attempted to address the key issues in forming of components.

For example, Changzhou University has published a patent titled "A Method and Device for Strengthening Metal Material by Pulse Current Coupled with Laser Shot Peening" with patent number CN112853086A. This patent mainly utilizes an electro plastic deformation induced by electric pulses and an ultra-high strain rate plastic deformation induced by laser peening to increase an amplitude and a depth of residual compressive stress. However, it does not involve the field of forming, electric pulses are mainly used as a means to improve a plasticity of metal materials, without pre-forming the metal panels as a whole, nor constraining the forming of the sheet during the electrification process, making it impossible to manufacture large and complex integral components. Another example is Ningbo University's patent titled "Laser Shock Assisted Creep Aging Forming Method for Complex Curvature Thin-walled Components", with patent number CN116274593A. This patent mainly primarily subjects an aluminum alloy thin-walled component to laser shocking and then places the component in a closed space wrapped in a vacuum bag, which is then sent into an autoclave for creep age forming. However, it involves a single forming surface and requires customized molds for different curvature components, resulting in high processing costs. The wrapping and preparation work before creep aging of the components are time-consuming and labor-intensive, leading to a low forming efficiency. The mentioned components are thin-walled components, with a thickness of 3-5 mm, making it impossible to form large thick plates. Jiangsu University has published a patent titled "Device and Method for Multiple Laser Peening Forming under Rigid Constraint Layer," with patent number CN115945776A. This invention primarily uses nanosecond pulsed laser heating to melt and deposit tiny black lacquer particles at specified positions, completing multiple laser peening formations under rigid constraints. However, this forming method is only an improvement to the laser peening process and does not involve component-level plastic forming. It lacks a forming platform and cannot meet the multi-curvature forming requirements of components. Jiangsu University has also published another patent titled "Method for Pulse Current-Assisted Laser Peening Forming and Hydrophobic Surface Preparation of Aluminum Alloy," with patent number CN114952010B. This invention primarily applies high-frequency pulse current and laser beam shocking simultaneously to surfaces of aluminum alloy to obtain a superhydrophobic curved aluminum alloy surface. However, the bending of aluminum alloy involved in this invention occurs naturally under an action of laser shocking, rather than a required forming curvature. There is no forming-related constraint on samples, emphasizing the strengthening effect rather than component forming. Additionally, Northwestern Polytechnical University has published a patent titled "Fixture and Forming Method for Laser Peening Forming of Flexible Panels," with patent number CN113145740B. This invention primarily lifts a panel using lifting blocks to achieve an effect of bending the panel.

Therefore, there is an urgent need for a composite forming method combining electric pulse creep aging with laser peening for ribbed panels in aerospace applications.

SUMMARY

The objective of the present application is to provide a composite forming method combining electric pulse creep aging with laser peening, in order to solve the problems raised in the background technology.

To achieve the above objective, the present application provides a composite forming method combining electric pulse creep aging with laser peening, including the following steps:

Step S1: modeling a ribbed integral panel component using a finite element software, and simulating a creep forming process of the modeled model using the finite element software to determine localized difficult-to-deform areas of the ribbed integral panel component, and then marking a ribbed integral panel based on the determined localized difficult-to-deform areas;

Step S2: performing surface grinding and polishing pretreatment on the marked ribbed integral panel, and fixing the ribbed integral panel component on a flexible tooling platform via a plurality of universal lifting devices and clamping ends, and then pre-bending the ribbed integral panel into shape by using the plurality of universal lifting devices;

Step S3: performing a laser shock strengthening treatment on the localized difficult-to-deform areas of the pre-bent ribbed integral panel through a laser peening mobile platform.

Step S4: performing an electric pulse heating treatment on the ribbed integral panel after the laser shock strengthening treatment to achieve electric pulse creep age forming of the ribbed integral panel, and obtaining the ribbed integral panel component formed by the electric pulse creep aging;

Step S5: performing three-dimensional scanning on the ribbed integral panel component to obtain a component surface; determining whether an accuracy of the component surface meets a target accuracy by comparing the scanned component surface with a target surface of the component, when the accuracy of the component surface meets the target accuracy, completing the forming of the ribbed integral panel component and obtaining a formed component that meet requirements; when the accuracy of the component surface does not meet the target accuracy, and further marking areas on the ribbed integral panel component that have not meet the target accuracy, and proceed to step S6;

Step S6: performing a secondary laser shock strengthening treatment on the marked areas where the accuracy of the component surface does not meet the target accuracy by employing a laser peening device.

Step S7: repeating step S5 until the accuracy of the component surface of the ribbed integral panel component meets the target accuracy.

Furthermore, wherein in step S1, the simulation of the creep forming process of the ribbed integral panel component is specifically as follows: first, preparing samples by using the same materials as the ribbed integral panel, and carrying out basic experiments on the samples on a creep machine to obtain relevant parameters, including creep temperatures, creep times, and creep stress values, and then fitting the obtained relevant parameters and establishing constitutive equations of the ribbed integral panel, and finally, importing the constitutive equations into a simulation software, to simulate the forming process of the ribbed integral panel component.

Furthermore, wherein in step S2, during a process of pre-bending the ribbed integral panel component into shape, a digital image correlation (DIC) detection system is employed to monitor a surface temperature, a stress value and a strain value of the ribbed integral panel component in real time, and heights and angles of each universal lifting device are adjusted separately by using computer control to compare the target surface of the component, to pre-bend the ribbed integral panel into shape.

Furthermore, wherein each universal lifting device includes a lifting servo motor, a pitching servo motor and a universal suction cup, the lifting servo motor is mounted on the flexible tooling platform, an output end of the lifting servo motor is connected to a mounting seat, the pitching servo motor is connected to the universal suction cup through a pitching transmission mechanism, lifting and pitching actions of the universal lifting device are achieved by controlling the lifting servo motor and the pitching servo motor via a computer.

Furthermore, wherein in step S3 and step S6, process parameters for laser shock strengthening treatment includes: a laser pulse energy ranging from 2 to 30 J, a laser spot diameter from 0.5 to 3 mm, a spot overlap rate ranging from 50% to 90%, and a shock peening frequency ranging from 1 to 20 Hz.

Furthermore, wherein shock peening passes for the laser shock strengthening treatment are 1 to 5 passes.

Furthermore, wherein materials of a restraining layer used in the shock peening passes for laser shock strengthening treatment are water, glycerin, or glass plate, while materials of a protective layer are aluminum foil or black glue.

Furthermore, wherein in step S4, a specific process of the electric pulse creep age forming includes: electrically heating the ribbed integral panel after laser shock strengthening treatment through the clamping ends of the flexible tooling platform, adjusting a local curvature of the ribbed integral panel during the heating process by controlling the plurality of universal lifting devices in real time, so that an overall surface of the panel gradually approximates the target surface of the component, at the same time, monitoring a surface temperature, a stress value, a strain value, and an accuracy of the component surface in real time by employing a DIC detection system, and adjusting electric pulse working parameters and heights and angles of the universal lifting device in real time.

Furthermore, wherein in step S4, a voltage for the electric pulse creep age forming is 10~48V, a current is 60 A~36000 A, a positive pulse frequency is 10~2000 Hz, and an accuracy range for a surface temperature control is ±3° C.

The present application also provides a composite forming device for implementing the above method, including a laser peening mobile platform, a laser peening controller, a pulse oscilloscope controller, a central integrated controller, a flexible platform controller, a flexible tooling platform, universal lifting devices, clamping ends, a three-dimensional scanning device, and a DIC detection system, wherein the flexible tooling platform is equipped with a plurality of the universal lifting devices, and both sides of the flexible tooling platform are equipped with one clamping end, the plurality of the universal lifting devices are equipped with a ribbed integral panel, a surface of the ribbed integral panel is sequentially coated with an absorbent layer and a restraining layer from bottom to top, two ends of the ribbed integral panel are clamped and fixed by two clamping ends, the laser peening mobile platform, the three-dimensional scanning device, and the DIC detection system are respectively positioned above the ribbed integral panel, the central integrated controller is connected to the laser peening controller, the pulse oscilloscope controller, and the three-dimensional scanning device respectively, the laser peening controller is connected to the laser peening mobile platform, the pulse oscilloscope controller is connected to the two clamping ends, and the flexible platform controller is connected to the flexible tooling platform.

Compared to existing technologies, the present application has the following beneficial effects:

(1) The present application adopts electric pulse creep age forming: compared with traditional autoclave that use overall heating, an electric pulse heating speed is faster. By adjusting the frequency, the component can be quickly raised to a specified temperature and maintained, eliminating vacuum wrapping of the component, making the operation easier and more efficient. Compared to direct mechanical loading and forming of flexible tooling, the creep utilizing creep characteristics of materials to soften the materials can prevent bending and fracture. Simultaneously, electric pulse heating can increase dislocation density inside the materials, improve creep performance, and facilitate complex curvature forming.

(2) The present application combines laser peening with creep age forming process: for component forming, especially for a forming of complex curvature high rib plate. During the forming process, cracking and instability are easy to occur on the surface of the ribs or at the connection between the ribs and the skin, requiring pre-strengthening treatment on the surface of the materials. By generating residual compressive stress layers via laser shock, the pre-fabricated compressive stress inside the relevant structure can be offset by the tensile stress generated during the actual bending process, thereby reducing internal tensile stresses of the structure, lowering the risk of cracking, and improving formability. At the same time, after creep age forming, laser peening can be used to microform the localized difficult-to-deform areas of thick plates that have not meet the target surface, achieving a shape correction effect, ensuring that the accuracy of the component surface meets a standard while avoiding secondary creep age forming, improving a production efficiency, and reducing a process operation complexity.

(3) The present application uses the DIC detection system for real-time monitoring: since the entire forming process does not need to be carried out in a closed space (traditional creep aging needs to be carried out in a closed autoclave), the stress values, the strain values, and the temperatures of the component can be conveniently monitored in real-time throughout the entire composite forming process, to guide and adjust the electric pulse creep age forming process in real time, better match equipment control with process parameters such as the pulse current density, the heights and the angles of the universal lifting devices, and the creep times, etc., and improve the overall forming efficiency of components.

(4) In the present application, the flexible tooling platform utilizes the universal lifting devices as well as the clamping ends to achieve complex curvature pre-forming of components, rather than a single curvature. By strengthening the surface of the component via the laser peening and then utilizing electric pulse creep age forming, the component can be accurately formed.

In addition to the purposes, features, and advantages described above, the present application also has other purposes, features, and advantages. Below, the present application will be further detailed with reference to the accompanying drawings.

BRIEF DESCRIPTION OF DRAWINGS

The accompanying drawings are provided to further illustrate embodiments of the present application and constitute a part of the present application, which, together with the subsequent specific embodiments, facilitate explanation of the present application's instances. However, they do not constitute limitations on the present application's instances. In the accompanying drawings.

Wherein, 1—laser peening mobile platform; 2—laser peening controller; 3—pulse oscilloscope controller; 4—central integrated controller; 5—a flexible platform controller; 6—flexible tooling platform; 7—universal lifting device; 8—clamping end; 9—ribbed integral panel; 10—absorbent layer; 11—restraining layer; 12—three-dimensional scanning device; 13—DIC detection system.

DETAILED DESCRIPTION OF THE EMBODIMENTS

The present application will be described in detail below in conjunction with the various embodiments shown in the accompanying drawings. However, it should be noted that these embodiments are not intended to limit the present application. Equivalent transformations or substitutions of functions, methods, or structures made by those of ordinary skill in the art according to these embodiments fall within the protection scope of the present application.

Figure 1:
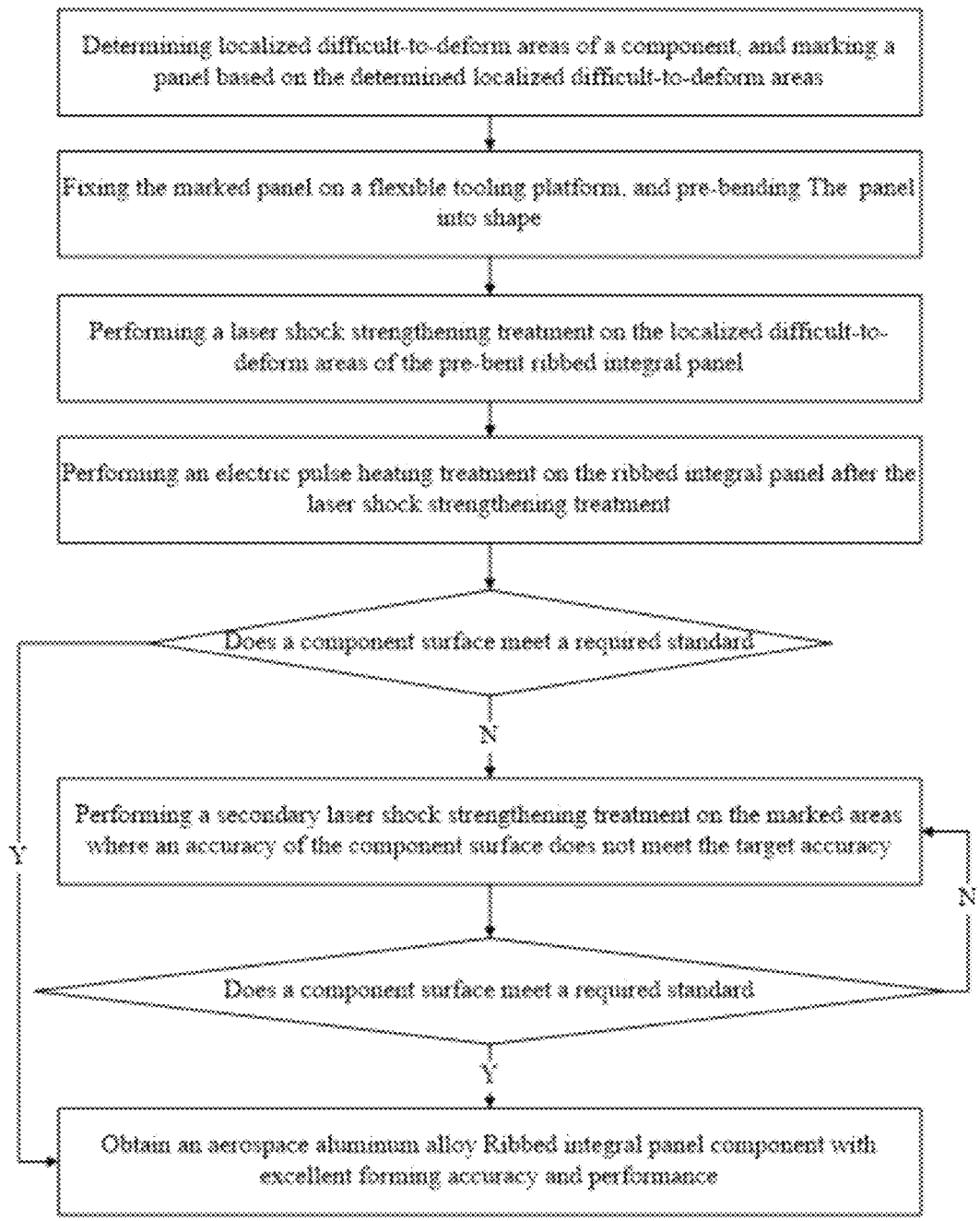
FIG. 1 illustrates a flowchart of a composite forming method combining electric pulse creep aging with laser peening provided by an embodiment of the present application.

Referring to FIG. 1, the embodiment of the present application provides a composite forming method combining electric pulse creep aging with laser peening, including the following steps:

Step S1, modeling a ribbed integral panel component using a finite element software, and simulating a creep forming process of the modeled model using the finite element software to determine localized difficult-to-deform areas of the ribbed integral panel component, and then marking a ribbed integral panel based on the determined localized difficult-to-deform areas (high stress areas, easy cracking areas). Wherein, the simulation of the creep forming process is specifically as follows: first, preparing samples by using the same materials as the ribbed integral panel, and carrying out basic experiments on the samples on a creep machine to obtain relevant parameters, including creep temperatures, creep times, and creep stress values, and then fitting the obtained relevant parameters and establishing constitutive equations of the ribbed integral panel, and finally, importing the constitutive equations into a simulation software, to simulate the forming process of the ribbed integral panel component. Wherein, the difficult-to-deform areas and the high stress areas specifically refers to rib surfaces, skin surfaces, and R-zones connecting ribs and skins on the ribbed panel component.

Step S2, performing surface grinding and polishing pretreatment on the marked ribbed integral panel, and fixing the ribbed integral panel on a flexible tooling platform via a plurality of universal lifting devices 7 and clamping ends 8, and then pre-bending the ribbed integral panel into shape by using the plurality of universal lifting devices on a flexible tooling platform. Wherein, each universal lifting device includes a lifting servo motor, a pitching servo motor and a universal suction cup. The lifting servo motor is mounted on the flexible tooling platform, and an output end of the lifting servo motor is connected to a mounting seat. The pitching servo motor is connected to the universal suction cup through a pitching transmission mechanism. Optionally, the universal suction cup can be selected as a high-temperature resistant one. The pitching transmission mechanism includes a pitching worm and a pitching turbine. The pitch servo motor is connected to the pitching worm in a transmission way, and the pitching worm engages with the pitching turbine to form a worm gear reducer. The pitch servo motor and the pitch worm are connected to the mounting seat through a bearing seat. The pitching turbine is fixedly connected to the universal suction cup, which is rotatably installed on the mounting seat. By controlling the pitch servo motor through a computer, a pitch motion of the universal suction cup is achieved, angle adjustments of the universal lifting devices are ultimately achieved, additionally, by controlling actions of the lifting servo motor through the computer, height adjustments of the universal lifting devices are achieved, which meets the forming requirements of complex curvature components.

In a specific embodiment, in step S2, during a process of pre-bending the ribbed integral panel component into shape, a digital image correlation (DIC) detection system is employed to monitor a surface temperature, a stress value and a strain value of the ribbed integral panel component in real time, and heights and angles of each universal lifting device are adjusted separately by using computer control to compare a target surface of the component, to pre-bend the ribbed integral panel into shape. Wherein, the DIC detection system is also called a digital image technology detection system, which combines a super-resolution image collector with digital image related technologies to realize real-time and non-real-time measurement and monitoring of a plate surface displacement field, a deformation field and a strain field when flexible molding system works, so as to control and optimize a numerical control molding process and realize deformation uniformity and stress minimization in the forming process.

Step S3, performing a laser shock strengthening treatment on the localized difficult-to-deform areas of the pre-bent ribbed integral panel through a laser peening mobile platform.

S4, performing an electric pulse heating treatment on the ribbed integral panel after the laser shock strengthening treatment to achieve electric pulse creep age forming of the ribbed integral panel, and obtaining the ribbed integral panel component formed by the electric pulse creep aging.

Step S5, performing three-dimensional scanning on the ribbed integral panel component formed by the electric pulse creep aging to obtain a component surface; determining whether an accuracy of the component surface meets a target accuracy by comparing the scanned component surface with the target surface of the component, when the accuracy of the component surface meets the target accuracy, completing the forming of the ribbed integral panel component and obtaining a formed component that meet requirements; when the accuracy of the component surface does not meet the target accuracy, and further marking areas on the ribbed integral panel component that have not meet the target accuracy, and proceed to step S6.

Step S6, performing a secondary laser shock strengthening treatment on the marked areas in step S5 where the accuracy of the component surface does not meet the target accuracy by employing a laser peening device.

Step S7, repeating step S5 until the accuracy of the component surface of the ribbed integral panel component meets the target accuracy.

In a specific embodiment, process parameters for laser shock strengthening treatment include: a laser pulse energy ranging from 2 to 30 J, a laser spot diameter from 0.5 to 3 mm, a spot overlap rate ranging from 50% to 90%, and a shock peening frequency ranging from 1 to 20 Hz. In step S3 and step S6, before performing the laser shock strengthening treatment on the component, a restraining layer is set on surfaces of the component and a protective layer is set on the restraining layer. Materials of the restraining layer are water, glycerin, or glass plate, while materials of the protective layer are aluminum foil or black glue. Shock peening passes for the first and the secondary laser shock strengthening treatment are 1 to 5 passes. In the present application, the laser shock strengthening treatment process is also known as laser peening technology. The laser peening technology is used for surface laser enhancement and local laser peening forming. For localized areas of the components that are easy to instability and cracking under high stress, surface laser strengthening treatment is carried out. For localized difficult-to-deform areas, localized laser peening forming treatment is carried out.

In a specific embodiment, the process of the electric pulse creep age forming is specifically as follows: electrically heating the ribbed integral panel after laser shock strengthening treatment through the clamping ends of the flexible tooling platform, adjusting a local curvature of the ribbed integral panel during the heating process by controlling the plurality of universal lifting devices in real time, so that an overall surface of the panel gradually approximates the target surface of the component, at the same time, monitoring a surface temperature, a stress value, a strain value, and an accuracy of the component surface in real time by employing a DIC detection system, and adjusting electric pulse working parameters and heights and angles of the universal lifting device in real time.

In a specific embodiment, an output voltage of an equipment for the electric pulse creep age forming is 10~48V, and a total output current is 60 A~36000 A. A positive pulse frequency is 10~2000 Hz, and an accuracy range for a surface temperature control is +3° C.

Example

The embodiment provides a composite forming method combining electric pulse creep aging with laser peening, including the following steps:

a、sampling and analyzing a large complex curvature ribbed integral panel to obtain corresponding creep characteristic parameters. The component is modeled in a Solid-Works software, and meshes are decomposed using a Hyper mesh software. The creep forming process of the component is simulated using an Abaqus finite element software to determine localized difficult-to-deform areas and high stress areas. Based on the determined localized difficult-to-deform areas, the ribbed integral panel is marked.

Wherein, the large complex curvature ribbed integral panel is made of 7XXX series aviation aluminum alloy material, with specific dimensions of 3000 mm×1000 mm×30 mm, and its interior is a mesh structure with a rib height of 22 mm and a skin height of 8 mm.

b、performing surface grinding and polishing pretreatment on the large complex curvature ribbed integral panel, and fixing the large complex curvature ribbed integral panel on the flexible tooling platform via the plurality of universal lifting devices and the clamping ends on both sides. The DIC detection system is employed to monitor in real-time changes in temperature, stress, strain, and other data related to the ribbed integral panel. Heights and angles of each universal lifting device are adjusted separately by using computer control to compare the target surface of the component, to pre-bend the ribbed integral panel into shape.

c、performing a multi-angle laser shock strengthening treatment on the marked ribs surfaces, skin surfaces, and R-zones connecting ribs and skins on the pre-bent ribbed integral panel through a laser peening mobile platform, which are prone to cracking and difficult to deform, through the laser peening mobile platform. Wherein, the first laser shock peening process uses an energy of 6 J, with a spot diameter of 2 mm, a shock peening frequency of 10 Hz, a spot overlap rate of 50%, and each area is shock peened for 3 passes. The restraining layer for the first laser peening process is dimethyl glycerin, and the protective layer is aluminum foil.

d、after undergoing processing step c, performing an electric pulse heating treatment on the ribbed integral panel after the laser shock strengthening treatment. Subsequently, electric pulse creep age forming is performed on the ribbed integral panel and the ribbed integral panel component formed by the electric pulse creep aging is obtained. Wherein, the electric pulse parameters are: a positive pulse frequency of 50 Hz, a peak current of 30,000 A, and a surface temperature control range of +2° C.

e、after creep age forming, performing three-dimensional scanning on the ribbed integral panel component by three-dimensional scanning device to obtain the component surface. The scanned component surface is compared with the target surface of the component by a TViewer software to determine whether an accuracy of the component surface meets the target accuracy. If so, the forming of the ribbed integral panel component is completed and a formed component that meet requirements is obtained. Otherwise, areas are further marked on the ribbed integral panel component that have not meet the target accuracy and step f will be executed.

f、performing a secondary laser shock strengthening treatment on the areas further marked in the above steps where the accuracy of the component surface does not meet the target accuracy by employing a laser peening device and performing a micro-correction on the localized difficult-to-deform areas. The component surface is obtained after the secondary laser shock treatment through a 3D scanning device, and whether an accuracy of the component surface meets the target accuracy is determined again. Repeat the process until the component surface accuracy is consistent with the target accuracy. Wherein, the second laser shock peening process uses an energy of 15 J, with a spot diameter of 2 mm, a shock peening frequency of 10 Hz, a spot overlap rate of 70%, and each area is shot peened for 3 passes. The restraining layer of the second laser peening process is dimethyl glycerin, and the protective layer is aluminum foil.

Figure 2:
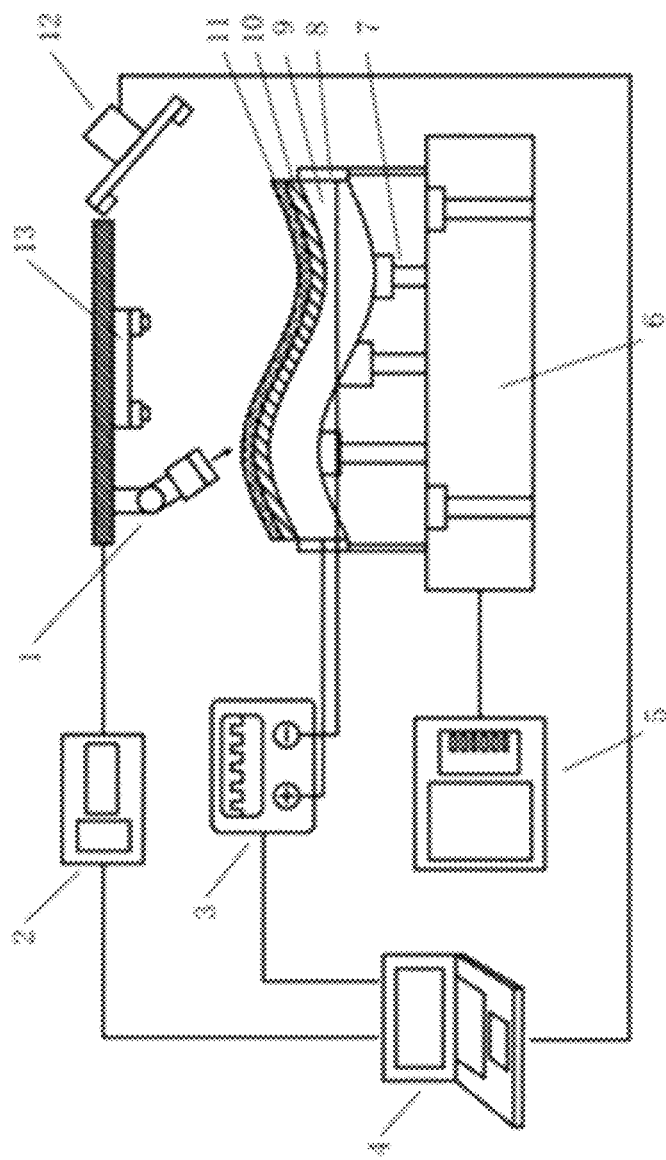
FIG. 2 illustrates the structural diagram of a composite forming device combining electric pulse creep aging with laser peening.

In conjunction with FIG. 2, the present application also provides a composite forming device combining electric pulse creep aging with laser peening for implementing the above composite forming method combining electric pulse creep aging with laser peening, including a laser peening mobile platform 1, a laser peening controller 2, a pulse oscilloscope controller 3, a central integrated controller 4, a flexible platform controller 5, a flexible tooling platform 6, universal lifting devices 7, clamping ends 8, a three-dimensional scanning device 12 and a DIC detection system 13. The flexible tooling platform 6 is equipped with a plurality of the universal lifting devices 7, and both sides of the flexible tooling platform 6 are equipped with one clamping end. The plurality of the universal lifting devices 7 are equipped with a ribbed integral panel 9, and two ends of the ribbed integral panel 9 are clamped and fixed by the clamping ends 8 respectively. The surface of the ribbed integral panel 9 is sequentially provided with an absorbing layer 10 and a restraining layer 11 from bottom to top, and the laser peening moving platform 1, the three-dimensional scanning device 12 and the DIC detection system 13 respectively positioned above the ribbed integral panel 9, the central integrated controller 4 is connected to the laser peening controller 2, the pulse oscilloscope controller 3 and the three-dimensional scanning device 12 respectively, the laser peening controller 2 is connected to the laser peening mobile platform 1, the pulse oscilloscope controller 3 is connected to the two clamping ends 8 respectively, and the flexible platform controller 5 is connected to the flexible tooling platform 6.

The above-mentioned is merely a preferred embodiment of the present application and is not intended to limit the present application. For those skilled in the art, various modifications and variations of the present application are possible. Any modifications, equivalent substitutions, improvements, etc., within the spirit and principles of the present application, shall be included within the scope of protection of the present application.

What is claimed is:

1. A composite forming method combining electric pulse creep aging with laser peening, comprising the following steps:

Step S1: modeling a ribbed integral panel component using a finite element software to produce a modeled model, and simulating a creep forming process of the modeled model using the finite element software to determine localized difficult-to-deform areas of the ribbed integral panel component, and then marking a ribbed integral panel based on the determined localized difficult-to-deform areas, wherein the localized difficult-to-deform areas are rib surfaces, skin surfaces, and curved transition regions between ribs and skins on the ribbed integral panel component;

Step S2: performing surface grinding and polishing pretreatment on the marked ribbed integral panel, and fixing the ribbed integral panel component on a flexible tooling platform via a plurality of universal lifting devices and clamping ends, and then pre-bending the ribbed integral panel component into shape by using the plurality of universal lifting devices, wherein during a process of pre-bending the ribbed integral panel component into shape, a digital image correlation (DIC) detection system is employed to monitor a surface temperature, a stress value and a strain value of the ribbed integral panel component in real time, and heights and angles of each universal lifting device are adjusted separately by using computer control to compare a target surface of the component, to pre-bend the ribbed integral panel into shape; each universal lifting device comprises a lifting servo motor, a pitching servo motor and a universal suction cup, the lifting servo motor is mounted on the flexible tooling platform, an output end of the lifting servo motor is connected to a mounting seat, the pitching servo motor is connected to the universal suction cup through a pitching transmission mechanism, lifting and pitching actions of the universal lifting device are achieved by controlling the lifting servo motor and the pitching servo motor via a computer;

Step S3: performing a laser shock strengthening treatment on the localized difficult-to-deform areas of the pre-bent ribbed integral panel through a laser peening mobile platform;

Step S4: performing an electric pulse heating treatment on the ribbed integral panel after the laser shock strengthening treatment to achieve electric pulse creep age forming of the ribbed integral panel, and obtaining the ribbed integral panel component formed by the electric pulse creep aging, wherein a specific process of the electric pulse creep age forming comprises:

electrically heating the ribbed integral panel after laser shock strengthening treatment through the clamping ends of the flexible tooling platform, adjusting a local curvature of the ribbed integral panel during the heating process by controlling the plurality of universal lifting devices in real time, so that an overall surface of the panel gradually approximates the target surface of the component, at the same time, monitoring a surface temperature, a stress value, a strain value, and an accuracy of a component surface in real time by employing a DIC detection system, and adjusting electric pulse working parameters and heights and angles of the universal lifting device in real time;

Step S5: performing three-dimensional scanning on the ribbed integral panel component to obtain the component surface; determining whether an accuracy of the component surface meets a target accuracy by comparing the scanned component surface with the target surface of the component, when the accuracy of the component surface meets the target accuracy, completing the forming of the ribbed integral panel component and obtaining formed component; when the accuracy of the component surface does not meet the target accuracy, and further marking areas on the ribbed integral panel component that have not meet the target accuracy, and proceed to step S6;

Step S6: performing a secondary laser shock strengthening treatment on the marked areas where the accuracy of the component surface does not meet the target accuracy by employing a laser peening device; and Step S7: repeating step S5 until the accuracy of the component surface of the ribbed integral panel component meets the target accuracy.

2. The composite forming method according to the claim 1, wherein in step S1, the simulation of the creep forming process of the ribbed integral panel component model is as follows: first, preparing samples by using material identical to that of the ribbed integral panel, and carrying out experiments on the samples on a creep machine to obtain relevant parameters, including creep temperatures, creep times, and creep stress values, and then fitting the obtained relevant parameters and establishing constitutive equations of the ribbed integral panel, and finally, importing the constitutive equations into a simulation software, to simulate the forming process of the ribbed integral panel component.

3. The composite forming method according to the claim 1, wherein in step S3 and step S6, process parameters for laser shock strengthening treatment comprises: a laser pulse energy ranging from 2 to 30 J, a laser spot diameter from 0.5 to 3 mm, a spot overlap rate ranging from 50% to 90%, and a shock peening frequency ranging from 1 to 20 Hz.

4. The composite forming method according to the claim 3, wherein shock peening passes for the laser shock strengthening treatment are 1 to 5 passes.

5. The composite forming method according to the claim 3, wherein materials of a restraining layer used in the shock peening passes for laser shock strengthening treatment are water, glycerin, or glass plate, while materials of a protective layer are aluminum foil or black glue.

6. The composite forming method according to the claim 1, wherein in step S4, a voltage for the electric pulse creep age forming is 10~48V, a current is 60A~36000 A, a positive pulse frequency is 10~2000 Hz, and an accuracy range for a surface temperature control is ±3° C.

* * * * *